United States Patent
Kataeva et al.

(10) Patent No.: US 11,562,215 B2
(45) Date of Patent: Jan. 24, 2023

(54) ARTIFICIAL NEURAL NETWORK CIRCUIT

(71) Applicant: DENSO CORPORATION, Kariya (JP)

(72) Inventors: Irina Kataeva, Kariya (JP); Shigeki Otsuka, Kariya (JP)

(73) Assignee: DENSO CORPORATION, Kariya (JP)

( * ) Notice: Subject to any disclaimer, the term of this patent is extended or adjusted under 35 U.S.C. 154(b) by 669 days.

(21) Appl. No.: 16/589,415

(22) Filed: Oct. 1, 2019

(65) Prior Publication Data

US 2020/0110985 A1 Apr. 9, 2020

(30) Foreign Application Priority Data

Oct. 3, 2018 (JP) .............................. JP2018-188437

(51) Int. Cl.
*G06N 3/04* (2006.01)
*G06N 3/063* (2006.01)
*G06N 3/08* (2006.01)
*G06V 10/44* (2022.01)

(52) U.S. Cl.
CPC ............... *G06N 3/063* (2013.01); *G06N 3/04* (2013.01); *G06N 3/08* (2013.01); *G06V 10/449* (2022.01)

(58) Field of Classification Search
CPC ............ G06N 3/063; G06N 3/04; G06N 3/08; G06V 10/449
USPC .......................................................... 706/41
See application file for complete search history.

(56) References Cited

U.S. PATENT DOCUMENTS

| | | | |
|---|---|---|---|
| 10,956,814 B2* | 3/2021 | Tran | G06N 3/08 |
| 10,970,441 B1* | 4/2021 | Zhang | G06N 3/063 |
| 11,157,810 B2* | 10/2021 | Kim | G06N 3/04 |
| 11,348,002 B2* | 5/2022 | Boybat Kara | G06N 3/08 |
| 2016/0283842 A1* | 9/2016 | Pescianschi | G06N 3/063 |
| 2017/0017877 A1 | 1/2017 | Kataeva et al. | |
| 2017/0017878 A1 | 1/2017 | Kataeva et al. | |
| 2017/0017879 A1 | 1/2017 | Kataeva et al. | |
| 2018/0309451 A1* | 10/2018 | Lu | H04Q 3/0004 |
| 2019/0332927 A1 | 10/2019 | Otsuka et al. | |
| 2020/0125936 A1* | 4/2020 | Kataeva | G06N 3/063 |

(Continued)

FOREIGN PATENT DOCUMENTS

WO 2017/010048 A1 1/2017
WO 2017/010049 A1 2/2017

OTHER PUBLICATIONS

K.K. Likharev, CrossNets: Neuromorphic Hybrid CMOS/Nanoelectronic Networks, Sci. Adv. Mater., vol. 3, pp. 322-331, Jun. 2011.

(Continued)

*Primary Examiner* — Ly D Pham

(74) *Attorney, Agent, or Firm* — Maschoff Brennan

(57) ABSTRACT

An artificial neural network circuit includes a crossbar circuit, and a processing circuit. The crossbar circuit transmits a signal between layered neurons of an artificial neural network. The crossbar circuit includes input bars, output bars arranged intersecting the input bars, and memristors. The processing circuit calculates a sum of signals flowing into each of the output bars. The processing circuit calculates, as the sum of the signals, a sum of signals flowing into a plurality of separate output bars and conductance values of the corresponding memristors are set so as to cooperate to give a desired weight to the signal to be transmitted.

9 Claims, 10 Drawing Sheets

(56) References Cited

U.S. PATENT DOCUMENTS

2020/0356848 A1* 11/2020 Lesso ................ G11C 13/0069
2021/0026601 A1   1/2021 Kobayashi et al.

OTHER PUBLICATIONS

Nili, Hussein et al. Compact Modeling of I-V Characteristics, Temperature Dependency, Variation, and Noise of Integrated, Reproducible Metal-Oxide Memristors., 2018.
U.S. Appl. No. 16/654,394; filed Oct. 16, 2019, Irina Kataeva, et al.

* cited by examiner

ARTIFICIAL NEURAL NETWORK CIRCUIT

CROSS REFERENCE TO RELATED APPLICATION

The present application claims the benefit of priority from Japanese Patent Application No. 2018-188437 filed on Oct. 3, 2018. The entire disclosures of all of the above applications are incorporated herein by reference.

TECHNICAL FIELD

The present disclosure relates to an artificial neural network circuit including a crossbar circuit provided with a memristor.

BACKGROUND

An artificial neural network (referred to as an artificial NN) such as a deep neural network exhibits recognition performance that surpasses recognition performance by conventional machine learning in the field of image recognition, for example.

SUMMARY

The present disclosure describes an artificial neural network circuit including a crossbar circuit transmitting a signal between layered neurons, and a processing circuit. The crossbar circuit includes a plurality of input bars, a plurality of output bars arranged intersecting the input bars, and a plurality of memristors to give a weight to the signal to be transmitted, as a variable resistance memory. The processing circuit calculates a sum of signals flowing into each of the output bars as signal processing in the layered neurons.

BRIEF DESCRIPTION OF DRAWINGS

Features and advantages of the present disclosure will become more apparent from the following detailed description with reference to the accompanying drawings. In the drawings.

DETAILED DESCRIPTION

Figure 1:
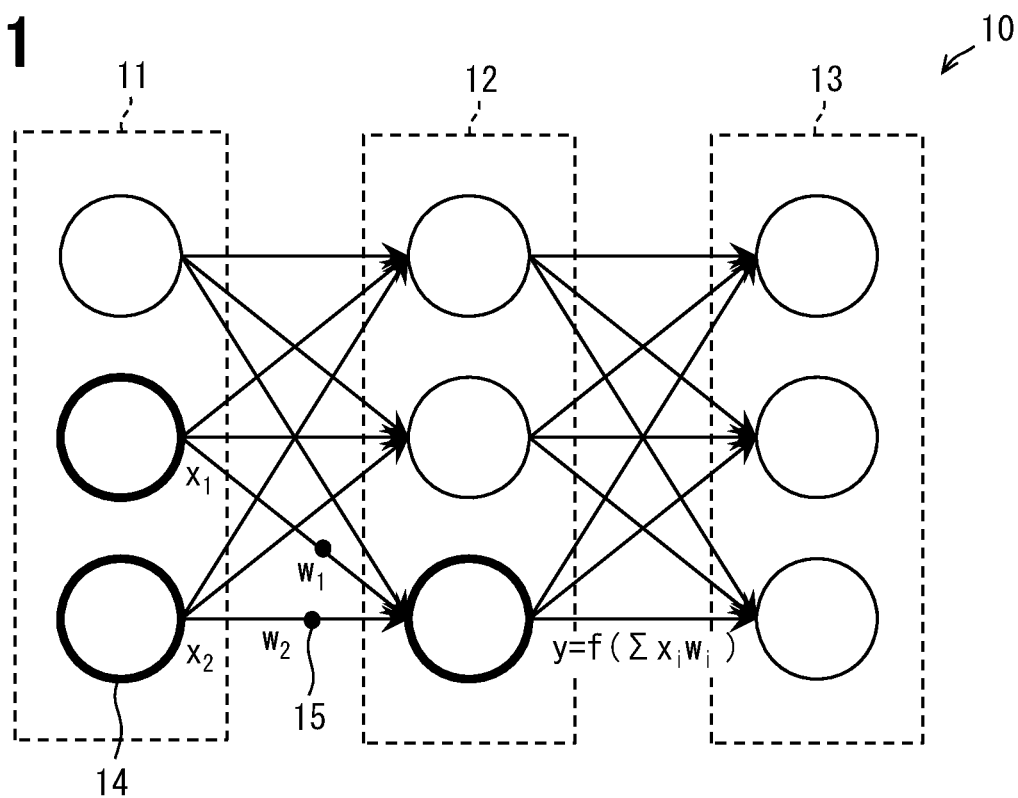
FIG. 1 is a diagram conceptually illustrating an example of a multilayer NN.

It has been confirmed that an artificial neural network (referred to as an artificial NN) such as a deep neural network exhibits recognition performance that surpasses recognition performance by conventional machine learning in the field of image recognition, for example. An artificial NN may have a high computational load, in general. An artificial NN may be software-implemented by a so-called general-purpose computing on GPU (referred to as a GPGPU) using a graphic processing unit (GPU) suitable for highly efficient parallel computation.

GPGPU may consume a large amount of power. Although an artificial NN using GPGPU may be applicable to an application based on cloud computing, for example, it may be difficult to apply the artificial NN to an application based on non-cloud computing. For example, examples of an application based on non-cloud computing may include an application used in a vehicle, being configured to recognize an obstacle to execute anti-collision control for preventing or alleviating a collision with the obstacle, an application for automatically driving a vehicle to a destination, and the like. Execution of these applications may require operation at high speed even with low power consumption. A hardware circuit having low power consumption, high speed, and a small size, dedicated to an artificial NN, may be desired.

As one of hardware circuits dedicated to artificial NNs, the inventors of the present application has researched an artificial NN circuit including a crossbar circuit having a resistance change type memory (hereinafter referred to as a "memristor"). The research results are disclosed in WO 2017/010048 A (corresponding to US 2017/0017877 A1) and WO 2017/010049 A (corresponding to US 2017/0017879 A1), which are incorporated herein by reference.

The crossbar circuit is configured such that multiple input bars and multiple output bars are disposed intersecting each other, and that each of the multiple input bars and each of the multiple output bars are connected at respective intersection points via the memristor. When voltage signals in accordance with output values of a previous stage neuron are input to each of the multiple input bars of the crossbar circuit, each of the voltage signals is multiplied by a conductance value of the memristor as a weight. Then, the voltage signals is output to a processing circuit connected to the output bars, and the processing circuit calculates a summed voltage signal. Then, the processing circuit generates and outputs an output value corresponding to an activation function from the summed voltage signal calculated as an input to a subsequent stage neuron. As described above, a synapse is hardware-implemented in the artificial NN using the crossbar circuit.

In an artificial NN circuit provided with such a crossbar circuit, a weight given to each signal to be transmitted is learned by computer simulation. Each memristor is set to a conductance value corresponding to the learned weight, for example. The memristor can be set to a different conductance between a minimum value and a maximum value in accordance with applied voltage. For example, the conductance of the memristor can be increased by applying negative write voltage and can be decreased by applying positive write voltage, using a voltage application device. The memristor maintains the conductance value set unless voltage having a magnitude equal to or more than positive and negative write voltage thresholds is applied.

In the artificial NN circuit provided with the crossbar circuit having the memristor, performance may deteriorate due to temperature characteristics of the memristor when environmental temperature at which the artificial NN circuit is placed changes. For example, when image recognition is performed using the artificial NN circuit, a recognition error rate may increase as the environmental temperature rises. Incidentally, the environmental temperature may correspond to temperature of surrounding environment, temperature where an artificial NN circuit is placed. In addition, the environmental temperature may correspond to temperature caused by heat generated by peripheral CMOS circuits around memristors on the same chip.

The present disclosure describes an artificial NN circuit capable of suppressing deterioration in performance when environmental temperature changes.

According to one aspect of the present disclosure, an artificial neural network circuit includes: a crossbar circuit that is configured to transmit a signal between layered neurons of an artificial neural network, wherein the crossbar circuit includes a plurality of input bars, a plurality of output bars arranged intersecting the input bars, and a plurality of memristors that are disposed at respective intersections of the input bars and the output bars to give a weight to the signal to be transmitted, as a variable resistance memory; and a processing circuit that is configured to calculate a sum of signals flowing into each of the output bars as signal processing in the layered neurons while a weight to a corresponding signal is given by each of the memristors. The processing circuit is configured to calculate, as the sum of the signals, a sum of signals flowing into a plurality of separate output bars and conductance values of the corresponding memristors are set so as to cooperate to give a desired weight to the signal to be transmitted.

Each of memristors provided in the crossbar circuit has temperature characteristics. The conductance value set in each of the memristors changes in accordance with change in environmental temperature. When a rate of change of the conductance value is uniform in each of the memristors included in the crossbar circuit, mutual relations of weights corresponding to the respective conductance values are maintained among the memristors. The conductance value of each of the memristors may not necessarily change at a uniform rate in accordance with change in environmental temperature. That is, the same temperature change may cause some of the memristors to be greatly changed in the conductance value, and some of the memristors to be less changed in the conductance value. When a rate of change of the conductance value due to change in environmental temperature varies in each of the memristors included in the crossbar circuit, the mutual relations of weights among the memristors collapses in accordance with the change in environmental temperature. The artificial NN circuit may deteriorate in performance.

The artificial NN circuit according to the present disclosure is configured such that the processing circuit calculates, as a sum of signals, a sum of signals flowing into multiple separate output bars in which a conductance value of the memristor is set to cooperate to give a desired weight to a signal to be transmitted.

Even when there is a variation in a rate of change of the conductance value of each of the memristors provided in the crossbar circuit with respect to change in environmental temperature, use of a configuration as described above enables reducing influence of the variation. That is, only calculating a sum of signals flowing into one output bar causes change in a conductance value of each of memristors connected to the output bar to be directly reflected in a sum of signals to be calculated. Calculating a sum of signals flowing into multiple separate output bars causes all of conductance values of respective memristors of the separate output bars, cooperating to give a desired weight to the same signal, to be less likely to indicate not only a relatively large change in the conductance values, but also a relatively small change in the conductance values. Calculating the sum of the signals flowing into the multiple separate output bars in the processing circuit enables obtaining an effect equivalent to bringing a relatively large change in the conductance values or a relatively small change in the conductance values, of the memristors, close to a more average change. It may be possible to suppress the influence of variation in change in the conductance value of each of the memristors when the environmental temperature changes. It may be possible to suppress the deterioration in performance of the artificial NN circuit.

The multiple output bars is used as differential paired output bars to enable a positive or negative weight to be given to a signal to be input to each of the multiple input bars in accordance with a difference between a weight of a memristor connected to an output bar on a positive side of the differential paired output bars and a weight of a memristor connected to an output bar on a negative side of the differential paired output bars between the multiple input bars. The output bar on the positive side of the differential paired output bars includes multiple output bars. The output bar on the negative side of the differential paired output bars includes multiple output bars as many as the output bars on the positive side. The processing circuit may be configured to calculate, as the sum of signals, a difference between a sum of signals output from the multiple output bars on the positive side, and a sum of signals output from the multiple output bars on the negative side.

According to this configuration, it may be possible to reduce influence of the variation in change in the conductance value of each of the memristors provided in the crossbar circuit, against change in the environmental temperature, while the crossbar circuit simulates an excitatory and inhibitory synapse.

An embodiment of an artificial NN circuit will be described in detail with reference to the drawings. The artificial NN circuit according to the present embodiment may be used to hardware-implement a multilayer NN (multilayer perceptron) in which neurons are hierarchized in at least three layers, and a so-called convolutional NN. In the following description, first, a multilayer NN and a convolutional NN that may be hardware-implemented by the artificial NN circuit of the present embodiment will be described.

FIG. 1 is a diagram conceptually illustrating an example of a multilayer NN 10. As illustrated in FIG. 1, the multilayer NN 10 includes an input layer 11, an intermediate layer 12, and an output layer 13. Each of the input layer 11, the intermediate layer 12, and the output layer 13 has at least one neuron 14. The intermediate layer 12 is also called a hidden layer.

When input data for the multilayer NN 10 is input to the input layer 11, outputs $x_1, x_2, \ldots$, corresponding to the input data, are output from each neuron 14 of the input layer 11. Then, the outputs $x_1, x_2, \ldots$, are multiplied, respectively by weights $w_1, w_2, \ldots$, as synapses, and are input to the at least one neuron 14 of the intermediate layer 12. The at least one neuron 14 of the intermediate layer 12 calculates a sum $\Sigma w_i x_i$ of the multiplied outputs, and converts the sum $\Sigma w_i x_i$ using an activation function "f" such as ReLU or tanh to generate an output "y" ($=f(\Sigma w_i x_i)$). Then, the generated output "y" is output to each neuron 14 of a subsequent layer. The subsequent layer is the output layer 13 when the multilayer NN 10 has three layers. When the multilayer NN 10 has four or more layers, the subsequent layer is a subsequent intermediate layer (not illustrated). As described above, the input data is converted by the activation function "f" of each neuron 14 and is finally input to the output layer 13. The at least one neuron 14 of the output layer 13 converts the input using a soft max function, for example, and outputs it.

The multilayer NN 10 is applicable to an application of classifying an image into multiple categories (e.g., numerals of 0 to 9) using an image (e.g., an MNIST data set) as input data. In this case, the input data to the input layer 11 can be pixel values (e.g., 0 to 255) of the image. The output from each neuron 14 of the output layer 13 may be configured to be probability that the image as input data belongs to each category. The weights of synapses of the multilayer NN 10 are determined by learning to be suitable for the application described above.

An image as input data may be classified into multiple categories by selecting a category corresponding to the highest probability among the probabilities output from the respective neurons 14 corresponding to the respective categories in the output layer 13. The multilayer NN 10 may be also applicable to other applications. For example, the multilayer NN 10 may be also applicable to detection of an object or a person, recognition of a human face, recognition of a road sign, or the like. In addition, the multilayer NN 10 may be also applicable to applications such as information compression, motion control, noise removal, and time series prediction.

Figure 2:
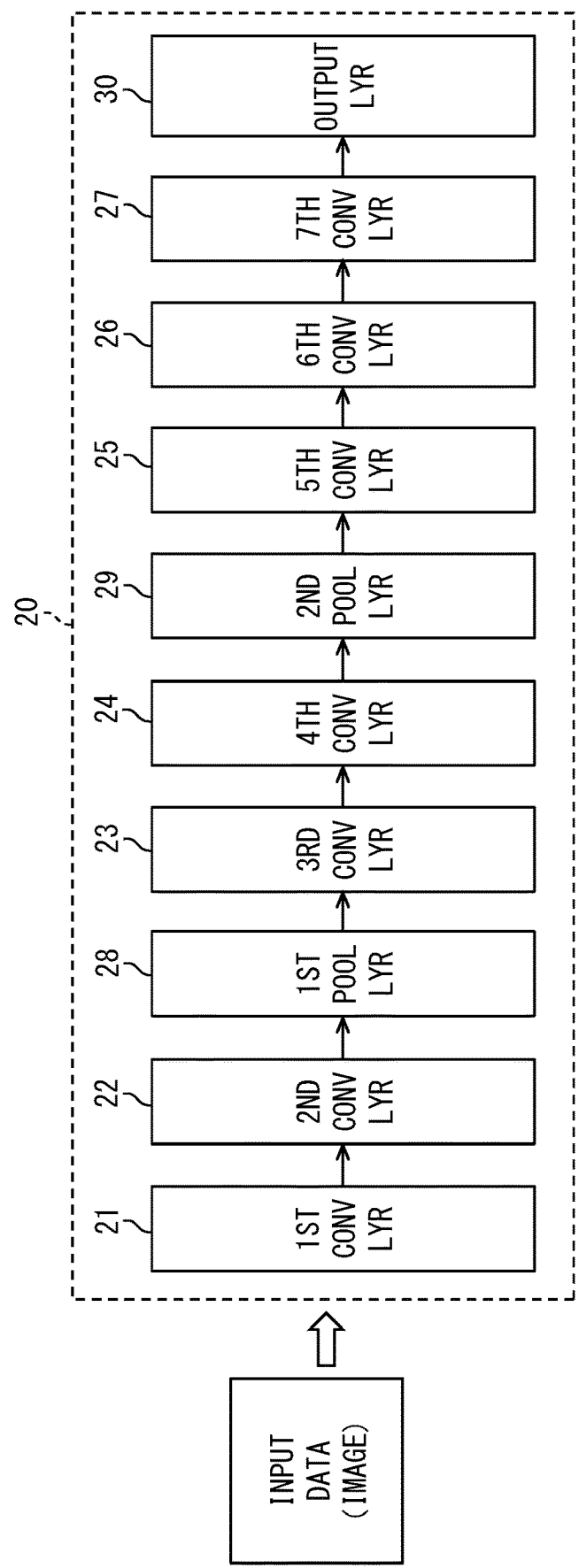
FIG. 2 is a diagram conceptually illustrating an example of a configuration of a convolutional NN.

The convolutional NN will be described. The convolutional NN is a multilayer NN capable of particularly increasing accuracy of image recognition. FIG. 2 is a diagram conceptually illustrating an example of a configuration of a convolutional NN 20. The convolutional NN 20 basically has a configuration in which convolution layers and pooling layers are alternately connected. For example, in the example illustrated in FIG. 2, the convolutional NN 20 includes seven layers composed of a first convolution layer 21, a second convolution layer 22, a third convolution layer 23, a fourth convolution layer 24, a fifth convolution layer 25, a sixth convolution layer 26 and a seventh convolution layer 27. Then, a first pooling layer 28 is provided between the second convolution layer 22 and the third convolution layer 23, and a second pooling layer 29 is provided between the fourth convolution layer 24 and the fifth convolution layer 25.

In the convolutional NN 20, the pooling layer is not necessarily connected next to a convolution layer, and the pooling layer may be connected after multiple convolution layers is connected. The number of layers of the convolution layers 21 to 27 and the pooling layers 28 to 29 is not limited to the example shown in FIG. 1. In general, image recognition performance may be further improved as the number of layers of the convolution layers 21 to 27 and the pooling layers 28 to 29 is increased.

The first to seventh convolution layers 21 to 27 each perform operation to convolute a filter have a predetermined size (e.g., 3 by 3, 5 by 5, or the like) using weights of synapses on input data (images) input to the respective input neurons of the first to seventh convolution layers 21 to 27. Each of the images as the input data has an input value (pixel value) arranged in two dimensions. The convolution operation of a filter in each of the convolution layers 21 to 27 is basically identical to convolution of a filter in general image processing, i.e., convolution of a small-sized image (filter) into an input image in two dimensions to blur the image or emphasize an edge.

Specifically, convolution operation of a filter is performed in each of the first to seventh convolution layers 21 to 27, integrating each of multiplication results obtained by multiplying a pixel value (weight) of each of images, with a small size as a filter, by a pixel value of each of regions, with the same size as that of the filter, in images as input data. At this time, when the input data includes multiple images, convolution operation using the same filter is performed in the same region of each of the multiple input images, and operation results each acquired by the convolution operation are integrated in an output neuron. In the output neuron, the calculated integration result passes through an activation function such as ReLU, and becomes an output value corresponding to a position of the filter in the image of each of the convolution layers 21 to 27.

The filter is shifted on the image as input data at a predetermined stride. The convolution operation described above is repeatedly performed at the shift position. Accordingly, in each of the convolution layers 21 to 27, an output value corresponding to the shift position of each filter is created throughout the entire input image. A result of two-dimensionally combining those output values so as to correspond to the shift position of the filter becomes output data by each of the convolution layers 21 to 27, and becomes input data of a subsequent layer.

As described above, the output data of each of the convolution layer 21 to 27 takes the form of an image two-dimensionally arranged, and is generally called a feature map. This feature map is generated as many as filters used in each of the convolution layers 21 to 27. Typically input data including multiple input images (feature map) is input to each of the convolution layers 22 to 27 subsequent to the second convolution layer 22. Even in the first convolution layer 21, when an input image is a color image, three images corresponding to RGB are input. When the input image is a grayscale image, only one image is input to the first convolution layer 21.

In the present embodiment, a filter used in each of the sixth and seventh convolution layers 26 and 27 has a size set to 1 by 1. That is, in the sixth and seventh convolution layers 26 and 27, convolution operation of 1 by 1 is performed such that a pixel value at the same position in each input image is multiplied by a weight of the filter, and then is added. A fully connected layer may be used as the sixth and seventh convolution layers 26 and 27. The convolution layer in which the convolution operation of 1 by 1 described above is performed is employed in the present embodiment to perform the convolution operation in each of the convolution layers 21 to 27, including the sixth and seventh convolution layers 26 and 27, in an analog domain using a crossbar circuit. This is because use of the fully connected layer excessively increases the number of input bars, so that it is difficult for one crossbar circuit to handle the input bars. The crossbar circuit will be described.

In the present embodiment, ReLU is used as the activation function, as described above. ReLU is a function defined by max (0, x). Using ReLU in which an upper limit value of an output value is not determined, as described above, enables obtaining merits such as quick calculation, no gradient loss, and leading to a high degree of sparsity. The activation function is not limited to ReLU, and another function (leaky ReLU, Parametric ReLU, maxout) or the like similar to ReLU may be used.

The weight of a filter described above is determined by learning. In the present embodiment, the convolutional NN 20 is temporarily constructed on a computer, and the learning is performed by supervised learning. Learning objects may include not only the weight of the filter, but also a magnitude of a weight for a bias input.

The first and second pooling layers 28 and 29 are each configured to not only increase constancy to a position change in a feature appearing in the input image but also reduce a size of an image to reduce the amount of calculation later by discarding a part of information indicating a position of an input image where compatibility with a filter is high.

Specifically, the first and second pooling layers 28 and 29 each define a window of a predetermined size (2 by 2, 3 by 3, or the like) with respect to the input image. Multiple input values of the input image are summed by averaging (average pooling) the input values (pixel values) in the window or using a maximum value of the input values in the window (maximum pooling). When the average pooling is used as pooling operation in each of the pooling layers 28 and 29, the pooling operation on each of the pooling layers 28 and 29 may also be performed using a crossbar circuit.

In the pooling operation, windows are shifted in the row and column directions so that the windows defining a pooling range are not superimposed on each other. The windows may be shifted so that the windows defining the pooling range are partially superimposed on each other. In addition, the pooling is performed for each input image (feature map), so that the number of input images before and after the pooling is constant.

The output layer 30 is configured to output probability that an image as input data belongs to each of multiple categories to be classified, by normalization using a soft max function, for example. An image as input data is classified into multiple categories by selecting a category corresponding to the highest probability among the probabilities output from the output layer 30.

A configuration for embodying the multilayer NN 10 and the convolutional NN 20 using an analog processing circuit composed of a crossbar circuit and an integrated circuit of a CMOS device will be described. The multilayer NN 10 and the convolutional NN 20 are configured using an element other than the crossbar circuit and the analog processing circuit. A general configuration for embodying the convolutional NN 20 will be described, as an example. The crossbar circuit and the analog processing circuit will be described.

Figure 3:
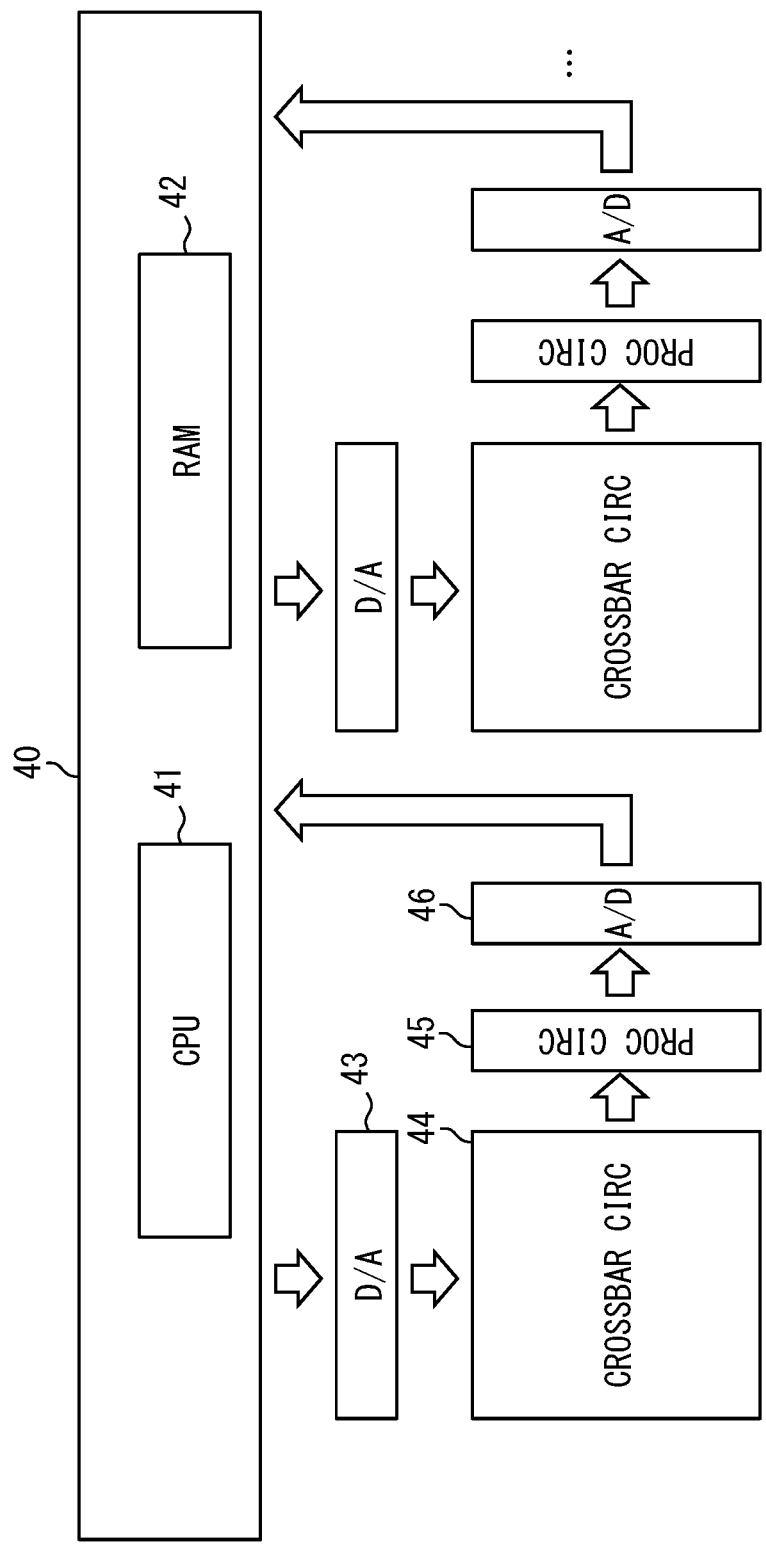
FIG. 3 is a diagram illustrating an example of a general configuration embodying a convolutional NN.

FIG. 3 is a diagram illustrating an example of the general configuration embodying the convolutional NN 20. As illustrated in FIG. 3, components for embodying the convolutional NN 20 in the present embodiment include mainly a microcomputer 40, a D/A (digital-to-analog) conversion circuit 43, a crossbar circuit 44, an analog processing circuit 45, and an A/D (analog-to-digital) conversion circuit 46.

The microcomputer 40 includes a CPU 41, a RAM 42, a ROM, and the like. The microcomputer executes various processes in accordance with a program stored in the ROM, for example. While a process for the first convolution layer 21 is described below, the microcomputer 40 executes a similar process in principle for the other convolution layers 22 to 27. A microcomputer may be referred to as a microcontroller, or a microprocessor.

First, the microcomputer 40 determines a region for performing convolution operation of a filter in an image as input data, and outputs a digital signal corresponding to a pixel value of each pixel included in the region to the D/A conversion circuit 43. Accordingly, the D/A conversion circuit 43 outputs an analog signal (voltage signal), corresponding to each pixel value in the region where the convolution operation is performed, to the crossbar circuit 44.

In addition, the microcomputer 40 executes a process of capturing output from the A/D conversion circuit 46 at the timing when the output is output after the crossbar circuit 44 and the analog processing circuit 45 finish arithmetic processing. At this time, the A/D conversion circuit 46 converts output values as many as the number of filters used in the first convolution layer 21, being processed by the convolution operation at a shift position of a filter, and the activation function, into a digital signal and outputs the digital signal. The microcomputer 40 stores the digital signal output from the A/D conversion circuit 46 in the RAM 42 while sorting the digital signal for each of the multiple filters.

Then, the microcomputer 40 shifts a region for executing the convolution operation of a filter by a predetermined stride in the input image, and outputs a digital signal corresponding to a pixel value included in the region after being shifted to the D/A conversion circuit 43, and executes a similar process to that described above. This process is repeated until the shift of a filter is complete in all regions of the input image. Digital data indicating feature maps as many as the number of filters, created by the first convolution layer 21, is stored in the RAM 42.

The multilayer NN 10 illustrated in FIG. 1 is not required to shift a filter at a predetermined stride. The microcomputer 40 is not required to capture each time an output value from each of the crossbar circuit 44 and the analog processing circuit 45. The multilayer NN 10 illustrated in FIG. 1 can directly use output from the analog processing circuit 45 as input into the crossbar circuit 44 of a subsequent layer.

Figure 4:
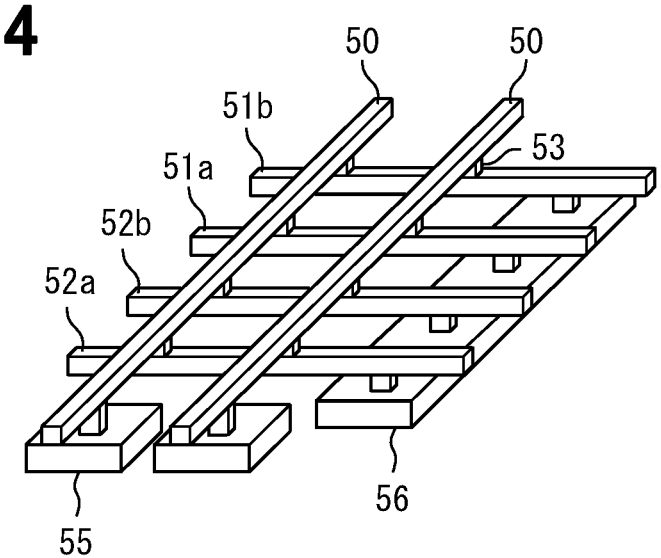
FIG. 4 is a diagram for illustrating a crossbar circuit.
Figure 5:
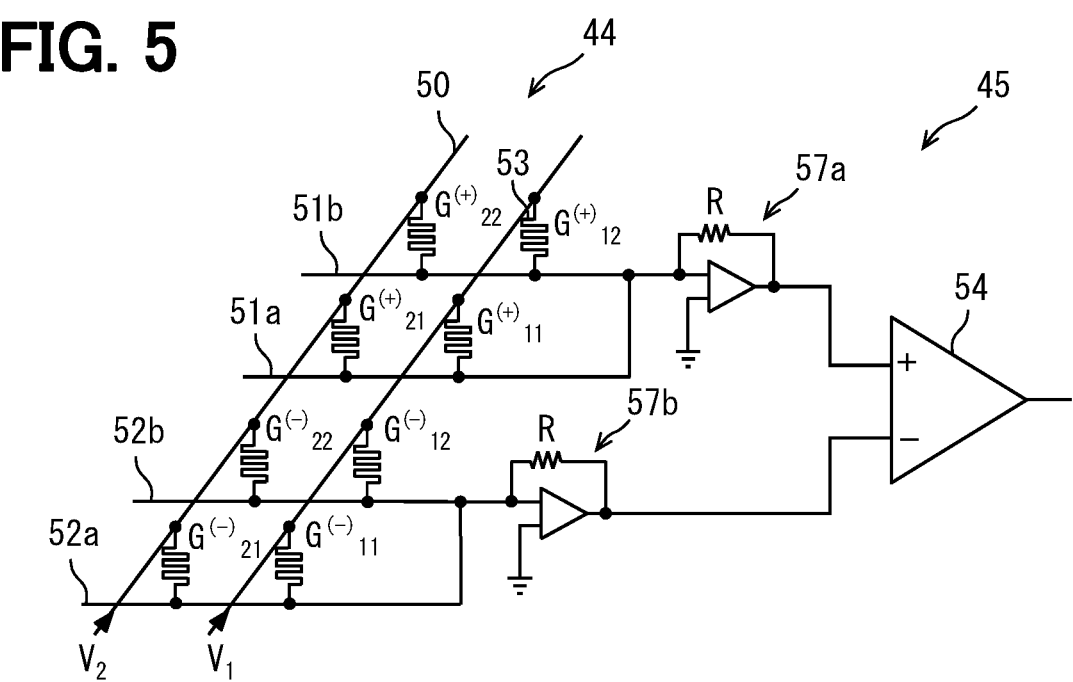
FIG. 5 is a diagram for illustrating a crossbar circuit.
Figure 6:
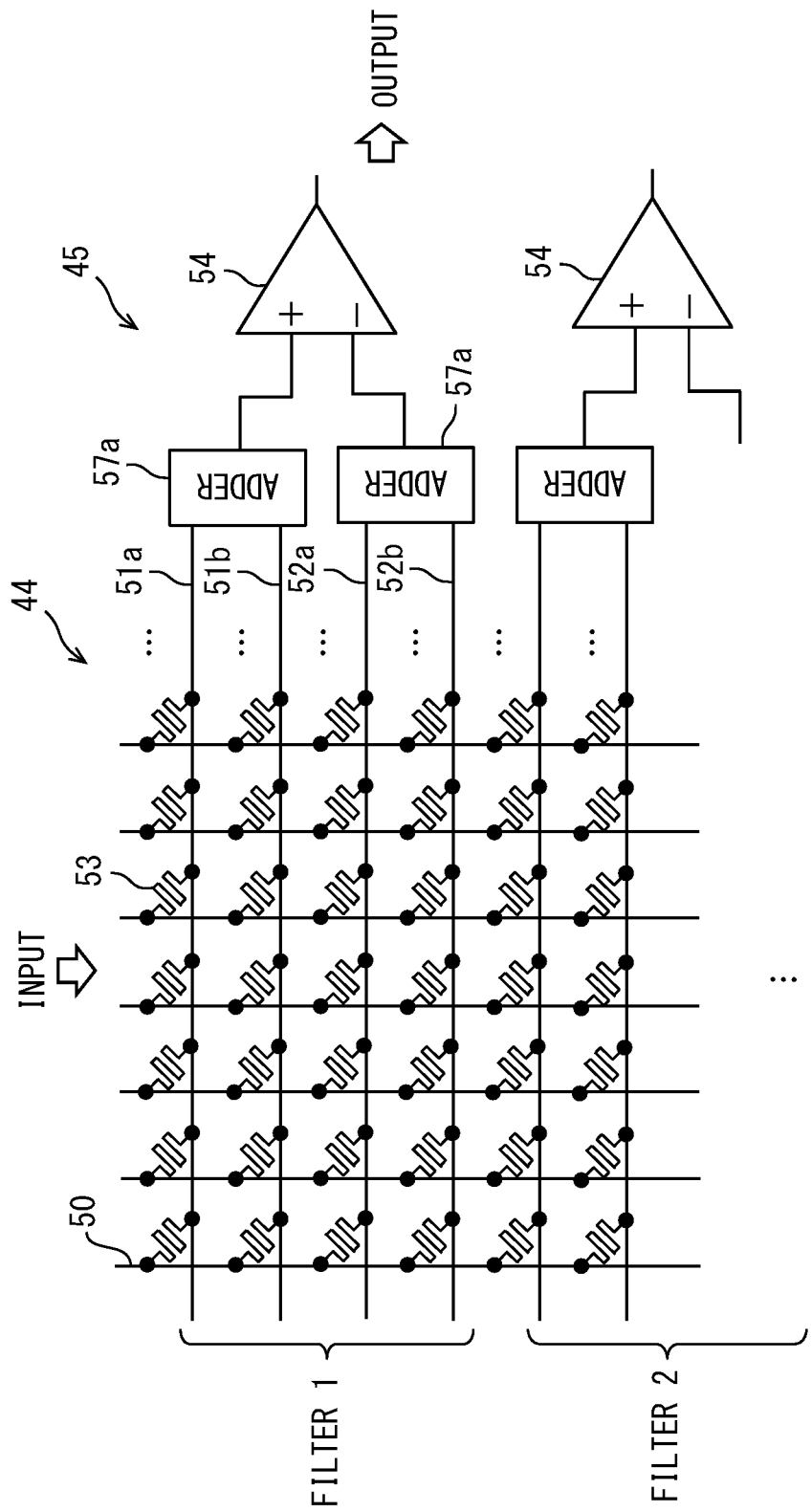
FIG. 6 is a diagram for illustrating a crossbar circuit.

A basic configuration of the crossbar circuit 44 will be described with reference to FIGS. 4 to 6. The crossbar circuit 44 is used to transmit a signal between layers adjacent to the multilayer NN 10 or the convolutional NN 20 described above. FIGS. 4 to 6 each illustrate only a part of the crossbar circuit 44 for convenience of illustration and explanation.

As illustrated in FIG. 4, the crossbar circuit 44 has multiple input bars 50 and multiple output bars 51a, 51b, 52a, and 52b. The multiple input bars 50 and the multiple output bars 51a, 51b, 52a, and 52b are arranged to intersect each other. The multiple input bars 50 and the multiple output bars 51a, 51b, 52a, and 52b may be formed on a CMOS substrate on which a CMOS element is formed. For example, a voltage signal corresponding to the pixel value described above is input to each of the multiple input bars 50 through an input neuron 55 composed of a CMOS element. Each of intersections of the multiple input bars 50 and the multiple output bars 51a, 51b, 52a, and 52b are provided with a memristor 53 serving as a variable resistance memory configured to give a weight to each of input signals to be transmitted to the multiple output bars 51a, 51b, 52a, and 52b from the input bars 50. The multiple input bars 50 and the multiple output bars 51a, 51b, 52a, and 52b are connected to each other through the corresponding memristors 53.

The memristor 53 is a variable resistance memory that can be set to a different resistance state between a minimum value of resistance and a maximum value thereof using applied voltage or flowing current. For example, a conductance value of the memristor 53 can be increased by applying negative write voltage, and can be decreased by applying positive write voltage, using a voltage application circuit (not illustrated). The memristor 53 maintains the resistance state (conductance value) set unless voltage equal to or more than the positive and negative write voltages is applied. Examples of an element available for the memristor 53 described above include a Pt/TiO$_2$/Pt metallic oxide element, a phase-change memory, a magnetic tunnel junction memory, Flash memory, a solid state resistive memory, and the like.

The crossbar circuit 44, and the analog processing circuit 45 serving as the output neuron 56, can be configured as a hybrid CMOS circuit in which the memristor 53 is incorporated, for example. The analog processing circuit 45 serving as the output neuron 56 will be described with reference to FIG. 5. FIG. 5 is an electric circuit diagram illustrating the crossbar circuit 44, and the analog processing circuit 45 serving as the output neuron 56.

As illustrated in FIG. 5, when a pair of output bars (51a and 52a, 51b and 52b) is used as differential paired output bars in the present embodiment, a positive or negative weight can be given to a signal to be input into each of the multiple input bars 50 in accordance with a difference between a weight (conductance value) $G^{(+)}$ by the memristors 53 connected to the output bars 51a and 51b on a positive side of the differential paired output bars and a weight (conductance value) $G^{(-)}$ by the memristors 53 connected to the output bars 52a and 52b on a negative side thereof between the multiple input bars 50. The output bars 51a and 51b on the positive side of the differential paired output bars are connected to a non-inverting input terminal of a differential amplifier 54, and the output bars 52a and 52b on the negative side thereof are connected to an inverting input terminal of the differential amplifier 54.

In the present embodiment, the output bars 51a and 51b on the positive side of the differential paired output bars include multiple output bars 51a and 51b. The output bars 52a and 52b on the negative side of the differential paired output bars also include multiple output bars 52a and 52b as many as the output bars on the positive side. The number of the output bars 51a, 51b, 52a, and 52b of the crossbar circuit 44 in the present embodiment is a multiple of the number of output bars of a conventional crossbar circuit (e.g., twice in FIGS. 4 and 5). While FIGS. 4 and 5 each illustrate an example in which the number of the multiple output bars 51a and 51b on the positive side of the differential paired output bars and the number of the multiple output bars 52a and 52b on the negative side thereof are each set to "2", the number of each of the output bars may be 3 or more. When the number of the output bars on the positive and negative sides of the differential paired output bars is set to "3", the number of the output bars is tripled as compared with a configuration without output bars for superimposition. When the number of the output bars on the positive and negative sides is set to "4", the number of the output bars is quadrupled.

The differential paired output bars in the present embodiment serve as same-weighted differential paired output bars (also referred to as identical-weighted differential paired output bars) in which the multiple output bars 51a and 51b on the positive side are connected to the multiple memristors 53 set to have weights equal to each other, and the multiple output bars 52a and 52b on the negative side are connected to the multiple memristors 53 set to have weights equal to each other. Each of the memristors 53 connected to the corresponding one of the output bar 51a and the output bar 51b has a conductance value indicated as $G^{(+)}_{11}=G^{(+)}_{12}$, or $G^{(+)}_{21}=G^{(+)}_{22}$. The conductance value is set such that the same weight is given to each of the same input signals V1 and V2. Each of the memristors 53 connected to the corresponding one of the output bar 52a and the output bar 52b has a conductance value that is set such that $G^{(-)}_{11}=G^{(-)}_{12}$, or and $G^{(-)}_{21}=G^{(-)}_{22}$. In this manner, the conductance value of each of the memristors 53 is set to the same value so that the multiple output bars 51a and 51b on the positive side cooperates to give desired weights to the respective input signals V1 and V2. The conductance value of each of the memristors 53 is set to the same value so that the multiple output bars 52a and 52b on the negative side cooperates to give desired weights to the respective input signals V1 and V2.

The conductance value each of the memristors 53 connected to the corresponding output bars (51a and 51b, 52a and 52b), cooperating to give desired weights to the respective input signals V1 and V2, are not necessarily identical to each other. For example, while each of the memristors 53 connected to the respective multiple output bars, giving a weight to the same input signal, has a different conductance value, a sum of the conductance values may correspond to a desired weight.

As illustrated in FIG. 5, the analog processing circuit 45 includes: an adder 57a configured to calculate and output a sum of signals output from each of the multiple output bars 51a and 51b on the positive side to which the memristor 53 for giving a positive weight ($G^{(+)}$) to an input signal are connected; an adder 57b configured to calculate and output a sum of signals output from each of the multiple output bars 52a and 52b on the negative side to which the memristor 53 for giving a negative weight ($G^{(-)}$) to an input signal are connected; and the differential amplifier 54 configured to calculate and output a difference between the sums output from the respective adders 57a and 57b. In addition, although not illustrated, the analog processing circuit 45 also includes an activation function processing circuit configured to convert an operation difference output from the differential amplifier 54 using a predetermined activation function "f", and output the converted value. The adders 57a and 57b, the differential amplifier 54, and the activation function processing circuit each can be composed of CMOS elements in a CMOS substrate.

The adders 57a and 57b each have a configuration in which a resistor R is connected between input and output of an operational amplifier. When voltage signals $V_1$ and $V_2$ are input to each of the multiple input bars 50 as illustrated in FIG. 5, the voltage signal V1 is multiplied by conductance $G^{(+)}_{11}$ and $G^{(+)}_{12}$, and the voltage signal V2 is multiplied by conductance $G^{(+)}_{21}$ and $G^{(+)}_{22}$, and then the adder 57a adds the voltage signals to calculate a sum of them. The sum is further multiplied by R in the adder 57a. Likewise, the adder 57b also adds a result obtained by multiplying the voltage signal $V_1$ by conductance $G^{(-)}_{11}$ and $G^{(-)}_{12}$, and a result obtained by multiplying the voltage signal $V_2$ by conductance $G^{(-)}_{21}$ and $G^{(+)}_{22}$ to calculate a sum of them, and the sum is further multiplied by R.

Then, the differential amplifier 54 calculates and outputs a difference between the sum output from the adder 57a and the sum output from the adder 57b. The analog processing circuit 45 serving as the output neuron 56 acquires a result expressed in Expression 1 below.

$$\text{Output voltage} = R(G^{(+)}{}_{11}V_1 - G^{(-)}{}_{11}V_1 + G^{(+)}{}_{12}V_1 - G^{(-)}{}_{12}V_1 + G^{(+)}{}_{21}V_2 - G^{(-)}{}_{21}V_2 + G^{(+)}{}_{22}V_2 - G^{(-)}{}_{22}V_2 + \ldots)$$

(Expression 1)

When the input signal V1 is transmitted via the differential paired output bars 51a, 51b, 52a, and 52b, a weight given by each of the memristors 53 is R $G^{(+)}{}_{11} - G^{(-)}{}_{11} + G^{(+)}{}_{12} - G^{(-)}{}_{12} + \ldots$ ). In addition, a weight given by each of the memristors 53 when the input signal V2 is transmitted is R ($G^{(+)}{}_{21} - G^{(-)}{}_{21} + G^{(+)}{}_{22} - G^{(-)}{}_{22} + \ldots$ ). Although not illustrated in FIGS. 4 and 5, the same applies to weights for other input signals.

As described above, the differential paired output bars 51a, 51b, 52a, and 52b in the present embodiment are set, such that weights of each of multiple the memristors 53 connected to the corresponding multiple output bars 51a and 51b on the positive side are equal to each other, and that weights of each of multiple the memristors 53 connected to the corresponding multiple output bars 52a and 52b on the negative side are equal to each other. When the number of positive and negative output bars included in the differential paired output bars 51a, 51b, 52a and 52b is indicated as N, a weight for the input signal V1 above is RN ($G^{(+)}{}_{11} - G^{(-)}{}_{11}$) and a weight for the input signal V2 above is RN ($G^{(+)}{}_{21} - G^{(-)}{}_{21}$). Accordingly, when the resistor R is set to a value corresponding to 1/N, i.e., when weights to the respective input signals V1 and V2 are normalized by the number of the output bars on the positive and negative sides using the value of the resistance R, the weight for the input signal V1 is ($G^{(+)}{}_{11} - G^{(-)}{}_{11}$), and the weight for the input signal V2 is ($G^{(+)}{}_{21} - G^{(-)}{}_{21}$). The weights above are the same as weights for the respective input signals V1 and V2 when the number of each of output bars on the positive and negative sides is one. It may be possible to calculate a sum of the signals of the multiple output bars on the positive side and a sum of the signals of the multiple output bars on the negative side without expanding a signal range of the analog processing circuit.

FIG. 6 illustrates an example of the crossbar circuit 44 and the analog processing circuit 45 used for the convolutional NN 20. The crossbar circuit 44 and the analog processing circuit 45 illustrated in FIG. 6 each basically have a configuration similar to that of each of the crossbar circuit 44 and the analog processing circuit 45 described with reference to FIGS. 4 and 5. Each of the memristors 53 of the crossbar circuit 44 used for the convolutional NN 20 has a weight set to correspond to each of filters 1, 2, 3, . . . , used in the corresponding convolution layers 21 to 27.

Figure 7:
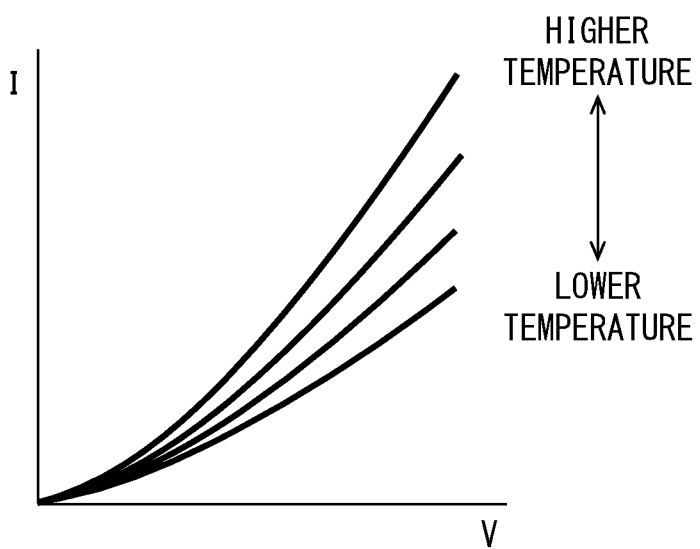
FIG. 7 is a graph showing an example of temperature characteristics of a memristor.

Here, each of the memristors 53 provided in the crossbar circuit 44 has temperature characteristics. The conductance value set in each of the memristors 53 changes in accordance with change in environmental temperature. FIG. 7 shows an example of temperature characteristics of the memristor 53 as described above. As shown in FIG. 7, even when the input voltage V is the same, the conductance value of the memristor 53 changes in accordance with environmental temperature to result in change in an output current I.

Figure 8:
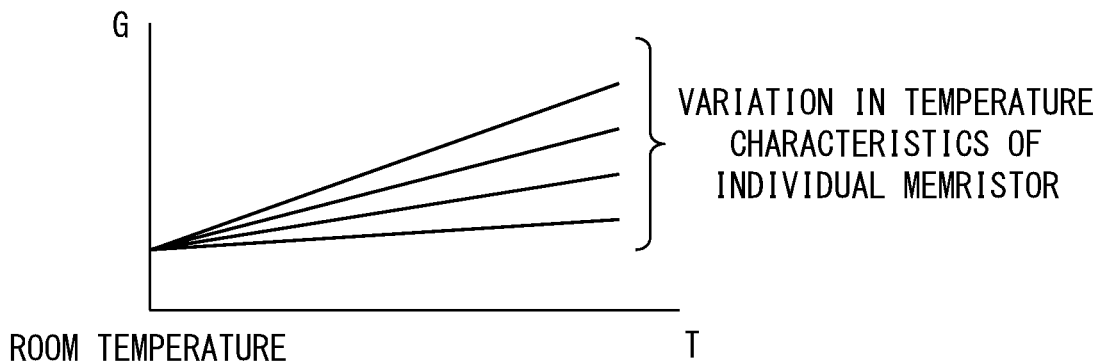
FIG. 8 is a graph for illustrating variations in temperature characteristics of a memristor.

When a rate of change of a conductance value of the memristor 53 included in the crossbar circuit 44 is uniform in all the memristors 53, mutual relations of weights corresponding to respective conductance values are maintained among the memristors 53. As shown in FIG. 8, the conductance value of each of the memristors 53 may not necessarily change at a uniform rate in accordance with change in environmental temperature. That is, the same temperature change may cause some of the memristors to be greatly changed in the conductance value, and some of the memristors to be less changed in the conductance value. As described above, when a rate of change of the conductance value due to change in environmental temperature varies in each of the memristors 53 included in the crossbar circuit 44, the mutual relations of weights among the memristors 53 collapses. The artificial NN circuit may deteriorate in performance.

As described above, the present embodiment is configured as follows: the output bar on the positive side of the differential paired output bars includes the multiple output bars 51a and 51b; the output bar on the negative side of the differential paired output bars includes the multiple output bars 52a and 52b as many as the output bars 51a and 51b on the positive side; and the analog processing circuit 45 calculates a difference between a sum of signals output from the multiple output bars 51a and 51b on the positive side, and a sum of signals output from the multiple output bars 52a and 52b on the negative side.

Even when there is a variation in a rate of change of the conductance value of each of the memristors 53 provided in the crossbar circuit 44 with respect to change in environmental temperature, use of a configuration as described above enables reducing influence of the variation. That is, only calculating a sum of signals flowing into one output bar by the analog processing circuit 45 causes change in a conductance value of each of memristors 53 connected to the output bar to be directly reflected in a sum of signals to be calculated. All of conductance values of each of the memristors 53 of the separate output bars (51a and 51b, 52a and 52b) cooperating to give a desired weight to the same input signal are less likely to indicate not only a relatively large change in the conductance values, but also a relatively small change in the conductance values. Calculating the sum of the signals flowing into the multiple separate output bars (51a and 51b, 52a and 52b) by the analog processing circuit 45 enables obtaining an effect equivalent to bringing a relatively large change in the conductance values or a relatively small change in the conductance values, of the memristors 53, close to a more average change. The influence of variation in change in the conductance value of each of the memristors 53 when the environmental temperature changes can be suppressed, so that it may be possible to suppress the deterioration in performance of the artificial NN circuit.

The present embodiment is also configured such that the analog processing circuit 45 calculates, as a sum of signals, a difference between a sum of signals output from the multiple output bars 51a and 51b on the positive side, and a sum of signals output from the multiple output bars 52a and 52b on the negative side. This configuration enables reducing influence of the variation in change in the conductance value of each of the memristors 53 provided in the crossbar circuit 44, against change in the environmental temperature, while the crossbar circuit 44 simulates an excitatory and inhibitory synapse.

In addition, the present embodiment is configured such that the conductance values of each of the memristors 53 connected to the corresponding multiple output bars (51a and 51b, 52a and 52b), cooperating to give desired weights to the respective input signals V1 and V2, are set to be identical to each other. As described above, the same conductance value may be set to each of the memristors 53 connected to the multiple output bars, and it may be possible to perform setting operation of the conductance value easily and in a short time.

Examples of effects obtained when the crossbar circuit 44 and the analog processing circuit 45 according to the present embodiment are used will be described.

An artificial NN circuit embodying the multilayer NN 10 having the configuration illustrated in FIG. 1 in which a weight of each of the memristors 53 of the crossbar circuit 44 and a bias to be input to one of the multiple input bars of the crossbar circuit 44 were learned using an MNIST data set, is prepared. An input image had a size of 28 by 28 pixels, and the number of neurons in the input layer 11 was 785 (28×28+1) corresponding to a pixel value of each pixel and a bias input. The number of neurons in the intermediate layer 12 was set to 301 in total by adding the number of neurons receiving input from neurons in the input layer 11 set to 300, to the number thereof for bias input. The number of neurons in the output layer 13 was 10. The number of input bars of the crossbar circuit 44 between the input layer 11 and the intermediate layer 12 was set to 785. The number (corresponding to the number of overlaps) of output bars on the positive and negative sides of the differential paired output bars was set to 2. Therefore, the number of output bars was 1200. In addition, the number of input bars of the crossbar circuit 44 between the intermediate layer 12 and the output layer 13 was 301 corresponding to the number of neurons (300) of the intermediate layer 12 and the bias input, and the number of overlaps of the differential paired output bars was 2, so that the number of output bars was 40.

As an object to be compared, there is also prepared an artificial NN circuit to be compared, including a crossbar circuit 44 in which the number of output bars on the positive and negative sides of the differential paired output bars was set to 1, and the others were similar to those of the artificial NN circuit described above.

Figure 9:
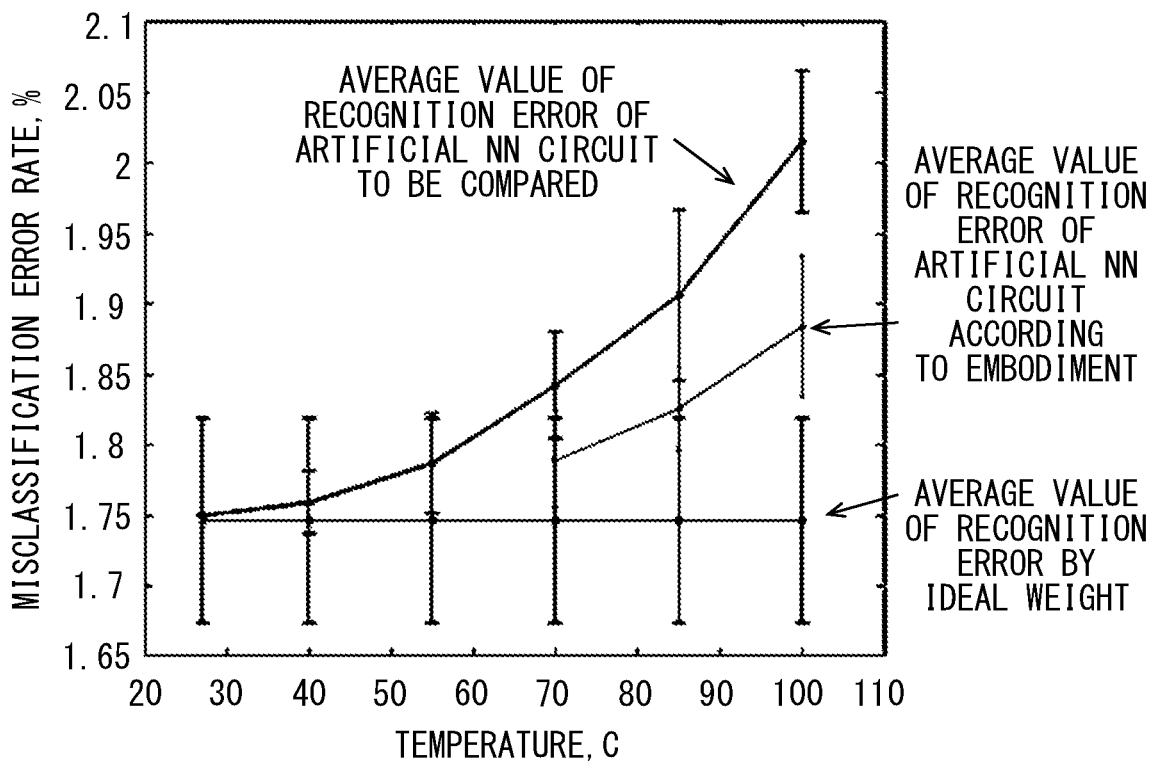
FIG. 9 is a graph showing examined results of an incidence rate of a recognition error of an artificial NN circuit according to an embodiment and an artificial NN circuit to be compared.

An incidence rate of a recognition error was examined using ten chips each mounted with the artificial NN circuit according to the present embodiment and ten chips each mounted with the artificial NN circuit to be compared. Results of the examination are shown in the graph of FIG. 9. The graph of FIG. 9 shows a line segment connecting variations of an incidence rate of a recognition error and its average value in the case of an ideal weight in which a weight of each of the memristors 53 does not change in accordance with temperature change; a line segment connecting variations of an incidence rate of a recognition error and its average value in the case where the number of output bars on the positive and negative sides of the differential paired output bars according to the present embodiment was 2; and a line segment connecting variations of an incidence rate of a recognition error by the artificial NN circuit to be compared and its average value the rate of occurrence of recognition error by the artificial NN circuit to be compared.

As described above, the artificial NN circuit to be compared is configured such that the number of output bars on the positive and negative sides of the differential paired output bars is set to 1, and there is no overlap of the output bars. A variation in magnitude of change in the conductance value of each of memristors connected to the output bars on the positive and negative sides of the differential paired output bars directly affects an incidence rate of a recognition error. As environmental temperature rises from room temperature (about 27° C.), the incidence rate of a recognition error also increases, and an average value of ten chips exceeds 2% at 100° C.

The artificial NN circuit according to the present embodiment is configured such that two output bars are connected as the output bars on the positive and negative sides of the differential paired output bars, and thus influence of a variation in magnitude of change in the conductance value of each of memristors can be suppressed. In the artificial NN circuit according to the present embodiment, an average incidence rate of a recognition error (average value) of the ten chips is lower than that of the artificial NN circuit to be compared at an environmental temperatures of from 70° C. to 100° C., and thus it can be seen that the artificial NN circuit is improved.

Figure 10:
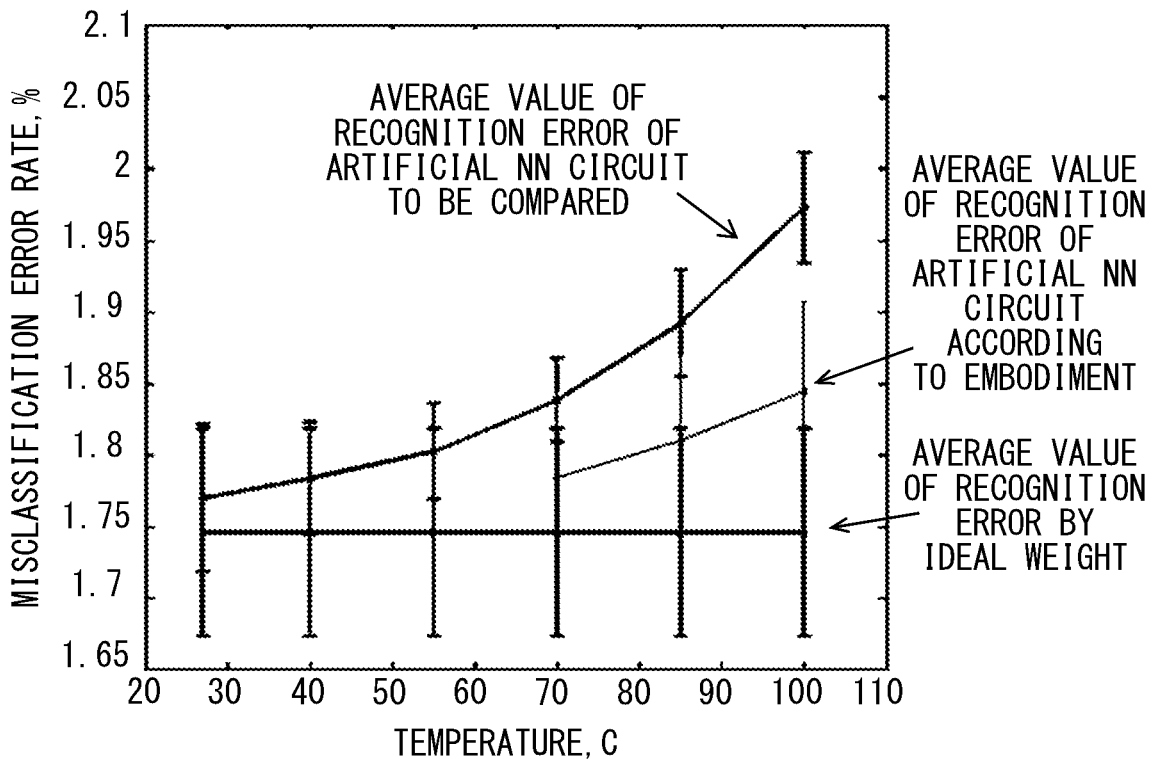
FIG. 10 is a graph showing examined results of an incidence rate of a recognition error of an artificial NN circuit according to an embodiment and an artificial NN circuit to be compared.

In addition, twenty different sets of learning values (weight and bias) were set in each of the ten chips mounted with the artificial NN circuit according to the present embodiment, and an incidence rate of a recognition error was examined. Likewise, similar twenty sets of learning values were set to each of ten chips mounted with the artificial NN circuit to be compared, and an incidence rate of a recognition error was examined. Results of the examinations are shown in the graph of FIG. 10. As shown in FIG. 10, the artificial NN circuit according to the present embodiment and the artificial NN circuit to be compared each have an average value of incidence rates of a recognition error of the ten chips to each of which the twenty sets of learning values were set, the average value of the incidence rates of a recognition error showing a tendency substantially similar to that in the graph of FIG. 9, and thus it can be seen that the average value of the incidence rates of a recognition error in the artificial NN circuit according to the present embodiment is improved more than that in the artificial NN circuit to be compared.

A similar verification was performed on the convolutional NN 20 having the configuration illustrated in FIG. 2. Specifically, as a convolutional NN circuit embodying the convolutional NN 20 according to the present embodiment, there were produced five chips in each of which the number of output bars on the positive and negative sides of the differential paired output bars in the crossbar circuit 44 of the first to seventh convolution layers was set to "2", and five chips in each of which the number thereof was set to "4". Then, learning values (weight and bias) learned using the CIFAR10 data set were set to each of the chips, and an incidence rate of a recognition error was examined. The CIFAR10 is a data set of images classified into ten types, such as an airplane, a car, a bird, and a cat.

As objects to be compared, there were also prepared five chips each mounted with the convolutional NN circuit to be compared in which the number of output bars on the positive and negative sides of the differential pair output bars in the crossbar circuit of each convolution layer was set to 1, and others were set to be similar to those of the convolutional NN circuit described above.

Then, first five chips each mounted with the convolutional NN circuit in which the number of output bars on the positive and negative sides of the differential paired output bars was set to 2, and second five chips each mounted with the convolutional NN circuit in which the number of output bars on the positive and negative sides of the differential paired output bars was set to 4, and third five chips each mounted with the convolutional NN circuit to be compared, according to the present embodiment, were used to examine an incidence rate of a recognition error. Results of the examinations are shown in the graph of FIG. 11.

Figure 11:
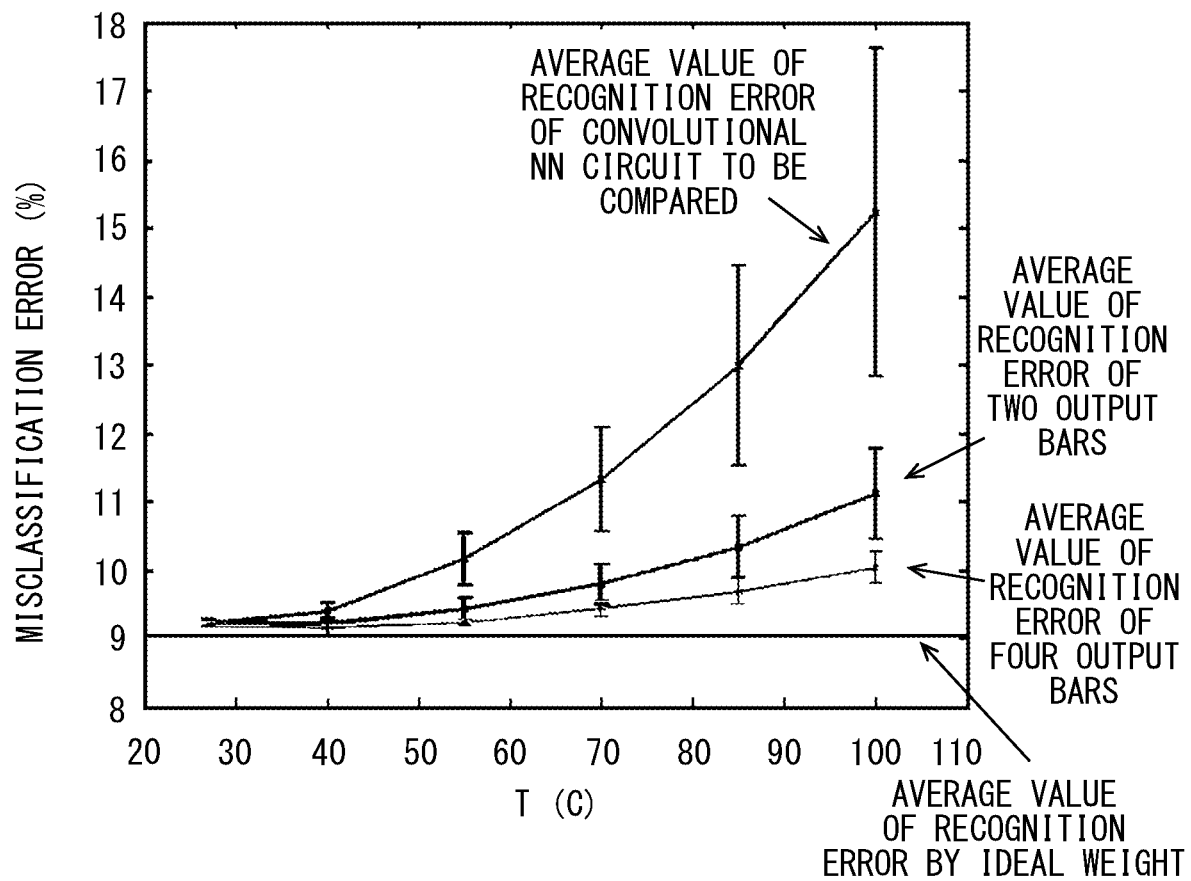
FIG. 11 is a graph showing examined results of an incidence rate of a recognition error of a convolutional NN circuit according to an embodiment and a convolutional NN circuit to be compared.

As shown in FIG. 11, in the convolutional NN circuit to be compared, the rate of occurrence of a recognition error rises as environmental temperature rises. Specifically, when the environmental temperature is around room temperature, an average value of the incidence rates of a recognition error is just over 9%, but when the environmental temperature rises to 100° C., the average value of the incidence rates of a recognition error rises to more than 15%.

In the convolutional NN circuit according to the present embodiment, when the number of output bars on the positive and negative sides of differential paired output bars was set to 2, the average value of the incidence rates of a recognition error at 100° C., for example, stays at around 11%. In the case of normalization with reference to an incidence rate of a recognition error using an ideal weight, the average value of the incidence rates of a recognition error when the number of output bars on the positive and negative sides of the differential pair output bar was set to 2 is about ½ of the average value of the incidence rate of a recognition error by the artificial NN circuit. In addition, when the number of output bars on the positive and negative sides of differential pair output bars was set to 4 in the convolutional NN circuit according to the present embodiment, the average value of the incidence rate of a recognition error can be further reduced compared to when the number of output bars on the positive and negative sides of differential paired output bars was set to 2. In the case of normalization with reference to an occurrence rate of a recognition error using an ideal weight, the average value of the incidence rates of a recognition error when the number of output bars on the positive and negative sides of the differential paired output bars was set to 4 is about ½ of the average value of the incidence rates of a recognition error when the number of the output bars was set to 4, in the example shown in FIG. 11.

Figure 12:
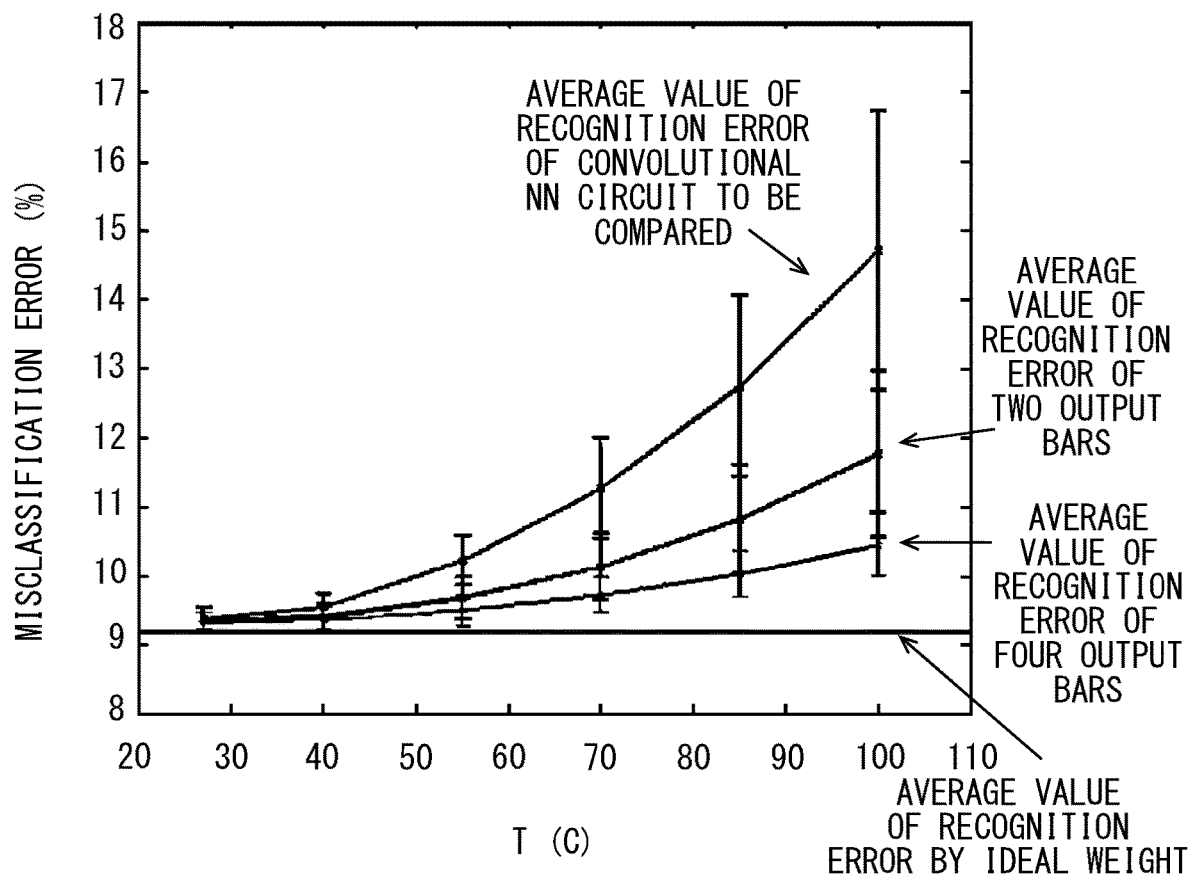
FIG. 12 is a graph showing examined results of an incidence rate of a recognition error of a convolutional NN circuit according to an embodiment and a convolutional NN circuit to be compared.

Different four sets of learning values (weight and bias) were set for each of the first five chips each mounted with the convolutional NN circuit in which the number of output bars on the positive and negative sides of the differential paired output bars was set to 2, and the second five chips each mounted with the convolutional NN circuit in which the number of output bars on the positive and negative sides of the differential paired output bars was set to 4, according to the present embodiment, to examine an incidence rate of a recognition error. Likewise, similar four sets of learning values were set to each of the third five chips mounted with the convolutional NN circuit to be compared, and an incidence rate of a recognition error was examined. Results of the examinations are shown in the graph of FIG. 12. As shown in FIG. 12, average values of incidence rates of a recognition error when the four sets of learning values were set to each of the first to third five chips show a tendency substantially similar to that of the graph of FIG. 9. It can be seen that the convolutional NN circuit according to the present embodiment, including multiple output bars on the positive and negative sides of the differential paired output bars, has an incidence rate of a recognition error is improved more than that in the convolutional NN circuit to be compared. It also can be seen that the incidence rate of a recognition error can be further reduced by increasing the number of output bars on the positive and negative sides of the differential paired output bars (2 to 4).

FIGS. 11 and 12 each show a result when multiple output bars on the positive and negative sides of the differential paired output bars was provided in the crossbar circuit in all convolution layers of the convolutional NN 20 having the configuration illustrated in FIG. 2.

Even when the number of output bars on the positive and negative sides of the differential paired output bars is increased in the crossbar circuit in some convolution layers instead of all convolution layers, a certain effect on reduction in recognition error can be obtained.

An example in which multiple output bars on the positive and negative sides of the differential paired output bars is provided in the crossbar circuit of some convolution layers, and effect obtained in that case, will be described.

Figure 13:
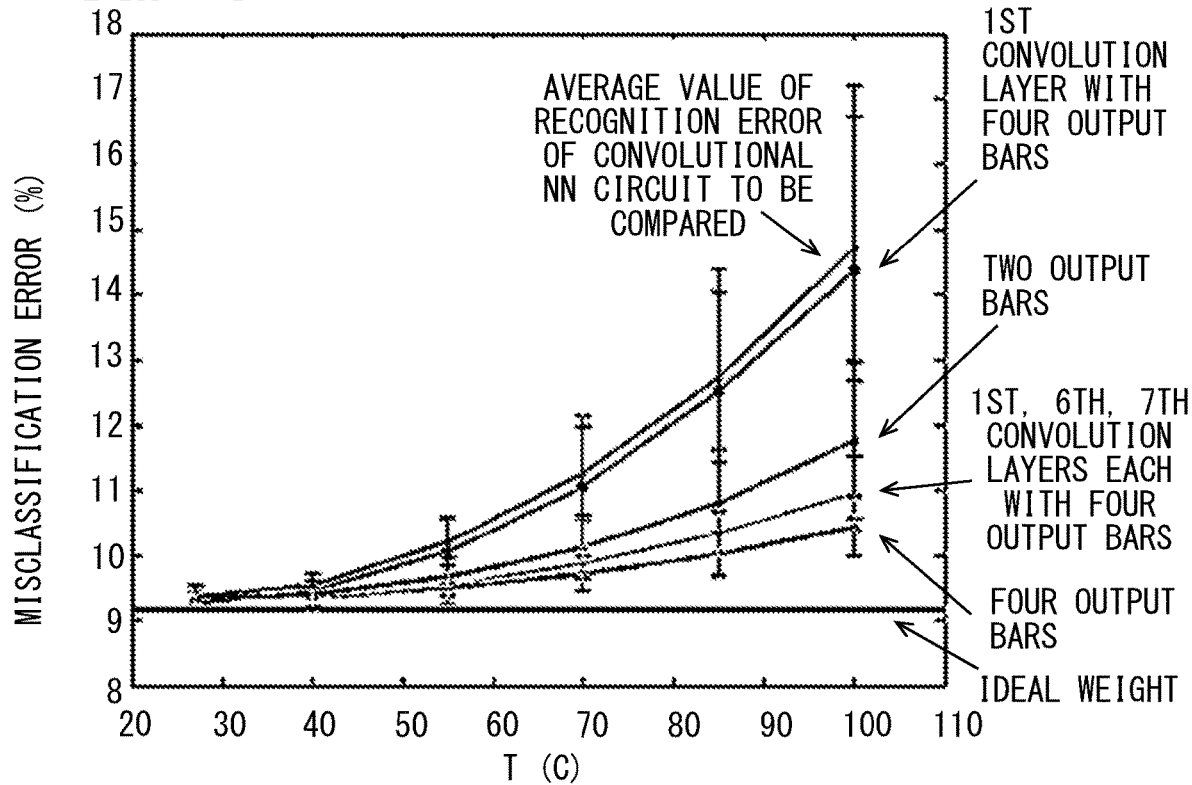
FIG. 13 is a graph showing a reduction degree of an incidence rate of a recognition error of various types of convolutional NN circuit according to an embodiment to an incidence rate of a recognition error of a convolutional NN circuit to be compared.

As a first example, there were prepared five chips mounted with a convolutional NN circuit in which the number of output bars on the positive and negative sides of the differential paired output bars of the crossbar circuit was set to 4 only for the first convolution layer. Four different sets of learning values (weight and bias) were set for each of the five chips, and an incidence rate of a recognition error was examined. As shown in FIG. 13, it is confirmed that an incidence rate of a recognition error in the convolutional NN circuit to be compared (the number of output bars on the positive and negative sides of the differential paired output bars in the crossbar circuit of each convolution layer is set to 1) is able to be slightly improved.

As a second example, there were prepared five chips mounted with a convolutional NN circuit in which the number of output bars on the positive and negative sides of the differential paired output bars of the crossbar circuit was set to 4 only for each of the first, sixth, and seventh convolution layers. Then, four different sets of learning values (weight and bias) were set for each of the five chips, and an incidence rate of a recognition error was examined. As shown in FIG. 13, it is confirmed that an incidence rate of a recognition error is able to be reduced more than that in the convolutional NN circuit in which the number of output bars on the positive and negative sides of the differential paired output bars was set to 2 for the crossbar circuit in all convolution layers. Then, from the results of the first and second examples, it can be said that even when multiple output bars on the positive and negative sides of the differential paired output bars of the crossbar circuit is set only for a convolution layer on an output side, for example, an incidence rate of a recognition error is likely to be reduced more than that in the convolutional NN circuit to be compared.

Here, in the convolutional NN 20 having the configuration illustrated in FIG. 2, the crossbar circuit of an intermediate convolution layer has the number of input bars and output bars that is likely to be more than that of the crossbar circuit of each of convolution layers on input and output sides. When the number of output bars is increased more than twice in a crossbar circuit with a large number of input bars and output bars, the crossbar circuit increases in size. This may cause difficulty in manufacturing and increase in cost.

In that respect, in the first example and the second example described above, the number of output bars on the positive and negative sides of the differential paired output bars in the crossbar circuit is increased in only some of convolution layers on the input side and/or the output side in which the numbers of input bars and output bars are relatively small. The difficulty described above can be avoided, and an incidence rate of a recognition error can be reduced more than that of the convolutional NN circuit to be compared.

A value obtained by multiplying a reduction rate of the incidence rate of a recognition error by various types of convolutional NN circuit according to the present embodiment with respect to the incidence rate of a recognition error of the convolutional NN circuit to be compared, by an increase rate of the number of output bars of the crossbar circuit in the various types of convolutional NN circuit according to the present embodiment with respect to the number of output bars in the crossbar circuit in the convolutional NN circuit to be compared, is defined as an efficiency product. When the efficiency product is less than 1, it means that an incidence rate of a recognition error can be further reduced even when the number of output bars is increased. It also means that an incidence rate of a recognition error can be efficiently reduced as the efficiency product decreases.

Figure 14:
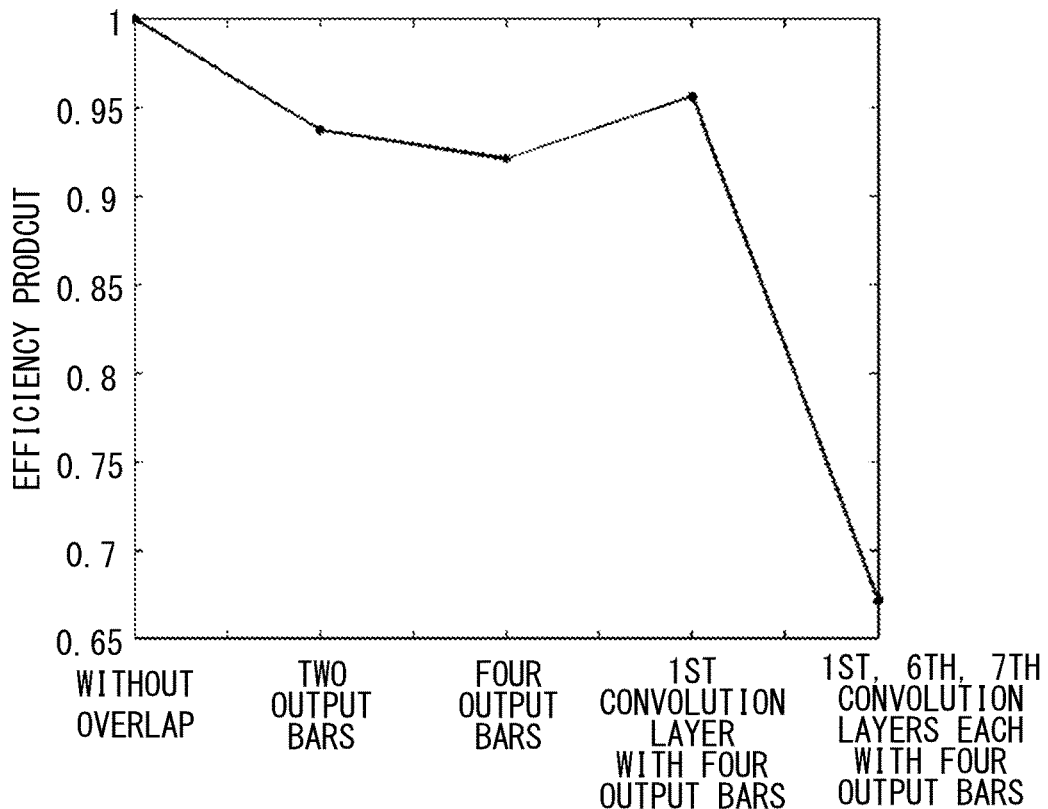
FIG. 14 is a graph showing efficiency products of various types of convolutional NN circuit according to an embodiment.

FIG. 14 is a graph showing a plot of efficiency products of various types of convolutional NN circuit according to the present embodiment. As shown in FIG. 14, there is not such a big difference among when the number of output bars on the positive and negative sides of differential paired output bars of the crossbar circuit in all convolution layers was set to 2, when the number of output bars on the positive and negative sides thereof was set to 4, and when the number of output bars on the positive and negative sides was set to 4 for only for the first convolution layer, and the efficiency product is within a range of about 0.92 to 0.95. When the number of output bars on the positive and negative sides of the differential paired output bars of the crossbar circuit was set to 4 for only the first, sixth, and seventh convolution layers, the efficiency product decreases to about 0.67. It can be said that the second example described above can effectively reduce the incidence rate of a recognition error without increasing the number of output bars of the crossbar circuit so much.

Although preferred embodiment of the present disclosure has been described above, the present disclosure is not limited thereto; various modifications may be contemplated.

In the embodiment described above, the differential paired output bars are set in the crossbar circuit 44 to enable positive and negative weights to be given to a signal to be transmitted. The differential paired output bars is not necessarily set in the crossbar circuit 44. In this case, every weight of each of the memristors 53 connected to the output bars has a positive sign. Then, the analog processing circuit 45 may be configured to calculates a sum of signals flowing into each of the multiple output bars in which conductance values of each of the memristors 53 are set to cooperate to give a desired weight to a signal to be transmitted.

In the embodiment described above, a sum of the signals of the multiple output bars on the positive side of the differential paired output bar is calculated, and a sum of the signals of the multiple output bars on the negative side thereof is calculated, and a difference between the sums is calculated. The order of operations is not limited to this configuration. A difference between a sum of signals of the output bar on the positive side to be differentially paired and an operation of signals of the output bar on the negative side to be differentially paired may be calculated, and then each difference signal may be calculated.

In the embodiment described above, an artificial NN is constructed in a computer, and learning values for weight and bias of each memristor 53 are calculated by supervised learning. The learning values for weight and bias may be calculated by actually propagating a voltage signal to the artificial NN circuit mounted on a chip.

In the embodiment described above, an original weight obtained by learning is set to each of the memristors 53 connected to the corresponding each of the multiple output bars on the positive side and the negative side of the differential paired output bars, and a calculated sum is normalized by the number of output bars on the positive side and the negative side in accordance with a value of the resistor R of the adder configured to calculate a sum of signals of the output bars. A method of normalizing the calculated sum is not limited to this configuration. For example, a weight obtained by normalizing the original weight obtained by learning by the number of the multiple output bars on the positive side or the negative side may be set to each memristor connected to the multiple output bars on the positive side of the differential paired output bars, and each memristor connected to the multiple output bars on the negative side thereof. This also enables a sum of normalized signals to be obtained.

The embodiment described above describes an example of a crossbar circuit of a convolution layer in the convolutional NN circuit. When a pooling layer is used to perform average pooling using a crossbar circuit, the crossbar circuit of the pooling layer also may be provided with multiple output bars on the positive and negative sides of differential paired output bars.

While various embodiments, configurations, and aspects of artificial neural network circuit according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. An artificial neural network circuit comprising:
   a crossbar circuit that is configured to perform a signal transmission between layered neurons of an artificial neural network, wherein the crossbar circuit includes
      a plurality of input bars,
      a plurality of output bars arranged intersecting the input bars, and
      a plurality of memristors that are disposed at respective intersections of the input bars and the output bars to give a weight to an input signal that is input from each of the plurality of input bars, each of the plurality of memristors is provided by a variable resistance memory; and
   a processing circuit that is configured to perform a signal processing in the layered neurons,
   wherein:
   the plurality of output bars include a first output bar and a second output bar,
   the plurality of memristors include a first memristor connected to the first output bar and a second memristor connected to the second output bar,
   both of the first output bar and the second output bar are connected to each of the plurality of input bars,
   the first memristor is set to have a first conductance value and the second memristor is set to have a second conductance value such that the first memristor and the second memristor give, in a cooperative manner, a desired weight to the input signal, and
   the signal processing comprises the processing circuit calculating a sum of output signals that is output from the first output bar and the second output bar, which are obtained by weighting the input signal from each of the plurality of input bars with the first conductance value of the first memristor and the second conductance value of the second memristor in the cooperative manner.

2. The artificial neural network circuit according to claim 1, wherein:
   the first output bar and the second output bar serve as identical-weighted output bars in which the first memristor and the second memristor respectively connected to the first output bar and the second output bar have identical weights equal to each other.

3. The artificial neural network circuit according to claim 1, wherein:
the first output bar and the second output bar serve as a differential paired output bars;
the first output bar is disposed on a positive side and the second output bar is disposed on a negative side;
the first output bar is configured to give a positive weight to the input signal and the second output bar is configured to give a negative weight to the input signal in accordance with a difference between
a weight of the first memristor connected between the first output bar on the positive side and each of the plurality of input bars and
a weight of the second memristor connected between the second output bar on the negative side and each of the plurality of input bars;
the first output bar includes multiple first output bar elements on the positive side and the second output bar includes multiple second output bar elements on the negative side,
a quantity of the first output bar elements is equal to a quantity of the second output bar elements,
the processing circuit is configured to calculate, as the signal processing, a difference between a sum of signals output from the multiple first output bar elements on the positive side and a sum of signals output from the multiple second output bar elements on the negative side.

4. The artificial neural network circuit according to claim 3, wherein:
the multiple first output bar elements on the positive side give identical weights to the input signal by the respective memristors connected to the multiple first output bar elements, and
the multiple second output bar elements on the negative side give identical weights to the input signal by the respective memristors connected to the multiple second output bar elements.

5. The artificial neural network circuit according to claim 3, wherein:
the processing circuit normalizes, by the quantity of the multiple first output bar elements on the positive side, a difference between the sum of signals output from the multiple first output bar elements on the positive side and the sum of signals output from the multiple second output bar elements on the negative side.

6. The artificial neural network circuit according to claim 3, wherein:
a weight of each of the respective memristors connected to the multiple first output bar elements on the positive side and the respective memristor connected to the multiple second output bar elements on the negative side is set by normalizing a predetermined weight, which is obtained by learning, by the quantity of the multiple first output bar elements on the positive side.

7. The artificial neural network circuit according to claim 3, wherein:
the artificial neural network is a multi-layered neural network in which the layered neurons are layered in at least three layers; and
the crossbar circuit including the differential paired output bars and the processing circuit configured to calculate the difference are provided between all layers of the layered neurons.

8. The artificial neural network circuit according to claim 3, wherein:
the artificial neural network is a multi-layered neural network in which the layered neurons are layered in at least three layers; and
the crossbar circuit including the differential paired output bars and the processing circuit configured to calculate the difference are provided between only a part of the layered neurons.

9. The artificial neural network circuit according to claim 8, wherein:
the crossbar circuit including the differential paired output bars and the processing circuit configured to calculate the difference are provided between at least one pair of layers of the layered neurons, the at least one pair of layers have a relatively small number of the plurality of input bars and/or the plurality of output bars of the crossbar circuit.

* * * * *